(12) United States Patent
Iseman

(10) Patent No.: US 6,224,353 B1
(45) Date of Patent: May 1, 2001

(54) PUMP CONTROL APPARATUS AND METHOD

(76) Inventor: Zan Iseman, 2647 River Rd., Madison Heights, VA (US) 24572

( * ) Notice: Subject to any disclaimer, the term of this patent is extended or adjusted under 35 U.S.C. 154(b) by 0 days.

(21) Appl. No.: 09/321,473

(22) Filed: May 27, 1999

(51) Int. Cl.[7] .............................. F04B 17/00; F04B 35/00
(52) U.S. Cl. .......................................... 417/326; 417/44.2
(58) Field of Search .................................. 169/43; 60/431, 60/413; 417/326, 218, 20, 44.2; 134/166; 222/22; 137/625.64

(56) References Cited

U.S. PATENT DOCUMENTS

| | | | |
|---|---|---|---|
| 3,974,879 | * 8/1976 | Nelson, Jr. et al. | 169/43 |
| 3,987,625 | * 10/1976 | Swatty et al. | 60/431 |
| 3,990,815 | * 11/1976 | De Vial | 417/326 |
| 4,072,443 | * 2/1978 | Heath | 417/218 |
| 4,805,653 | * 2/1989 | Krajicek et al. | 134/166 C |
| 4,934,565 | * 6/1990 | Heisey et al. | 221/22 |
| 5,056,561 | * 10/1991 | Byers | 137/625.64 |
| 5,540,554 | * 7/1996 | Masuzawa | 417/20 |
| 5,848,877 | * 12/1998 | Dill et al. | 417/44.2 |
| 5,974,797 | * 11/1999 | Nakao | 60/413 |
| 5,999,087 | * 12/1999 | Gunton | 340/309.5 |

* cited by examiner

Primary Examiner—Teresa Walberg
Assistant Examiner—Leonid Fastovsky
(74) Attorney, Agent, or Firm—William A. Bonk, III; Dykema Gossett PLLC

(57) ABSTRACT

A remote pump control apparatus and method that allows a septic tank service worker to physically control the end of the evacuation hose and operate a conventional pump which induces flow therein while servicing a septic tank including an actuator that mounts on and manipulates the flow control of the pump. The compressed fluid-driven actuator is controlled by a hand-held remote signal sender. A septic tank service worker depresses a switch on the hand-held remote signal sender and generates a signal which is received in a control box. The control box activates a solenoid which directs compressed fluid into one passage of a housing of the actuator, causing the actuator to manipulate the pump flow control in one direction, and into another passage, causing the actuator to manipulate the pump flow control in an opposite direction.

9 Claims, 5 Drawing Sheets

PUMP CONTROL APPARATUS AND METHOD

BACKGROUND OF THE INVENTION

1. Field of the Invention

The invention relates to pumping systems. More specifically, the invention relates to an apparatus and method for controlling a pumping system used for evacuating a septic system.

2. Discussion of Related Art

A great number of homes, especially those at a significant distance from an urban center, rely on septic systems for receiving and treating wastes. Over time, a septic tank fills or otherwise is unable to process waste received. An improperly functioning septic tank poses a threat to the health and safety of the occupants of the home connected to the septic tank as well as other local inhabitants. An improperly functioning septic system may not breakdown or otherwise treat pathogens in the waste which, if released untreated into the environment, may afflict local living organisms. Accordingly, septic tanks periodically must be serviced and evacuated so that the septic tank may continue to receive and treat wastes properly.

Evacuating a septic tank typically involves a septic service worker driving a septic service vehicle with evacuation and storage capabilities to the home owner's property and locating the service vehicle as close to the septic tank as possible. In many cases, the septic tank is not conveniently located for easy access from the road. Often, it is positioned in a remote section of a backyard. The septic tank also may be fenced off from the rest of the yard and surroundings so that children, domestic animals or other entities do not come into contact with the septic tank or commonly associated leach fields.

Because of the inconvenient positioning of the septic tank, a septic service worker often must navigate many obstacles in order to reach the septic tank. Additionally, because the septic tank may not be situated such that the service vehicle may park next to it, a septic service worker often must drag a large evacuation hose form the service vehicle over and through the same obstacles to access the septic tank.

Once the septic service worker reaches the septic tank, pries open the lid and introduces the evacuation hose into the tank, the septic service worker must cause the evacuation hose to withdraw the contents from the septic tank. Typically, the septic service worker must go from the septic tank to the service vehicle, turn on a pump which imparts a vacuum in the hose, then return to the septic tank to monitor the evacuation process.

Very often during evacuation of a septic tank, the evacuation hose becomes blocked by oversized or accumulated solids in the septic tank. A common practice used to unblock the evacuation hose is to reverse the flow to clear the blockage, then reverse the flow again to continue evacuating the tank. This "reverse and reverse again" technique may be required many times during evacuation of a septic tank.

In order to reverse the flow of the evacuation hose, the septic service worker must go to the service vehicle and manipulate appropriate controls for the pump. In order to do so, the septic service worker must negotiate again and again the obstacles between the septic tank and the service vehicle for every blockage.

This situation makes an unpleasant job all the more difficult. This practice also poses a significant health risk to the home owner and the home owner's neighbors. For example, while the septic worker is manipulating pump controls at the service vehicle, it is possible for the end of the hose to propel itself with septic contents from inside of the septic tank and spew harmful material into the surrounding environment. These waste materials spewed into the environment may be the source of pathogens and bacteria which may afflict the local inhabitants.

To avoid such a mishap, a septic service worker should be able to operate the pump while monitoring the end of the evacuation hose. To this end, the septic service worker should be able to operate the pump controls while being proximate to the end of the evacuation hose.

SUMMARY OF THE INVENTION

The invention is a remote pump control that allows a septic tank service worker to physically control the end of an evacuation hose and operate a pump which induces flow in the evacuation hose while servicing a septic tank. The invention conserves the amount of labor otherwise required to service a septic system. The invention reduces the wear and tear that ordinarily occurs during evacuation to the property on which a septic system is situated, namely the back and forth travel a septic tank service worker typically undertakes between the service vehicle and the remotely-located septic tank. The invention promotes safe operation of septic tank evacuation hose and associated servicing by allowing a septic service worker to remain at the end of the evacuation hose during septic system servicing. The invention promotes optimal septic system servicing because a septic service worker may finely tune septic tank evacuation and quickly overcome evacuation hose blockage. The invention is adaptable to septic service equipment in use in the field. The invention provides improved elements and arrangements thereof, in an apparatus and method for the purposes described which are inexpensive, dependable and effective in accomplishing its intended purposes.

An embodiment configured according to principles of the invention includes an actuator that mounts on and manipulates the flow control of a conventional pump. Movement of the compressed fluid-driven actuator is controlled by a hand-held remote signal sender. A septic tank service worker depresses a switch on the hand-held remote signal sender and generates a signal which is received in a control box. The control box activates a solenoid which directs compressed fluid into one of two conduits. Compressed fluid delivered by one conduit into one passage of a housing of the actuator causes the actuator to manipulate the pump flow control in one direction, while compressed fluid delivered by the other conduit into another passage causes the actuator to manipulate the pump flow control in an opposite direction.

These and other features of the invention will be appreciated more readily in view of the drawings and detailed description below.

BRIEF DESCRIPTION OF THE DRAWINGS

The invention is described in detail below with reference to the following drawings, throughout which similar reference characters denote corresponding features consistently, wherein.

DETAILED DESCRIPTION OF THE INVENTION

The invention is a remote pump control that allows a septic tank service worker to physically control the end of an evacuation hose and operate the pump which induces flow in the evacuation hose while servicing a septic, tank. An embodiment configured according to principles of the invention includes an actuator that mounts on and manipulates the flow control of a conventional pump. Movement of the pneumatically-driven actuator is controlled by a hand-held remote signal sender.

Figure 1:
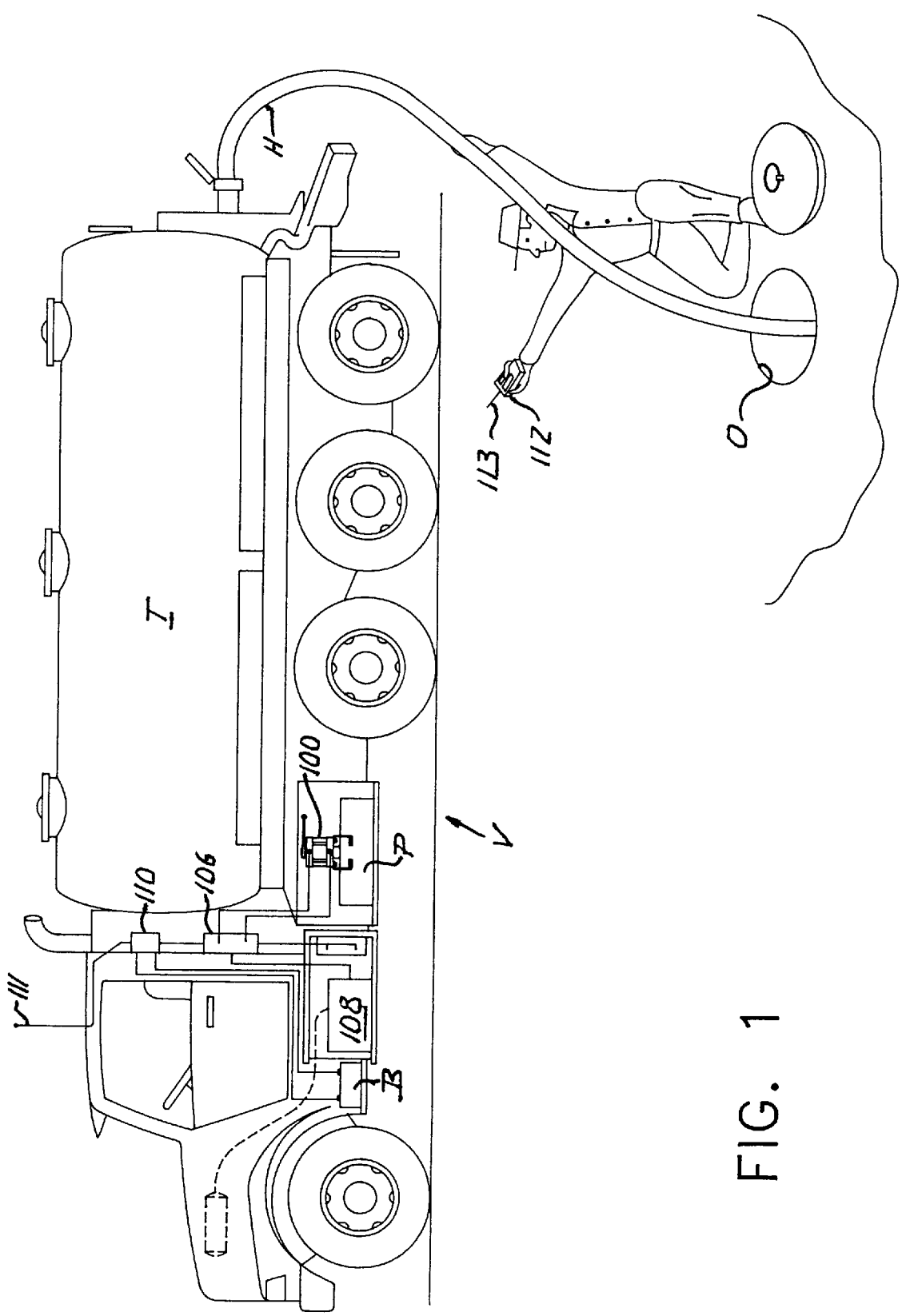
FIG. 1 is an environmental perspective view of an embodiment of a remote pump control apparatus constructed according to principles of the invention incorporated in a service vehicle.
Figure 2:
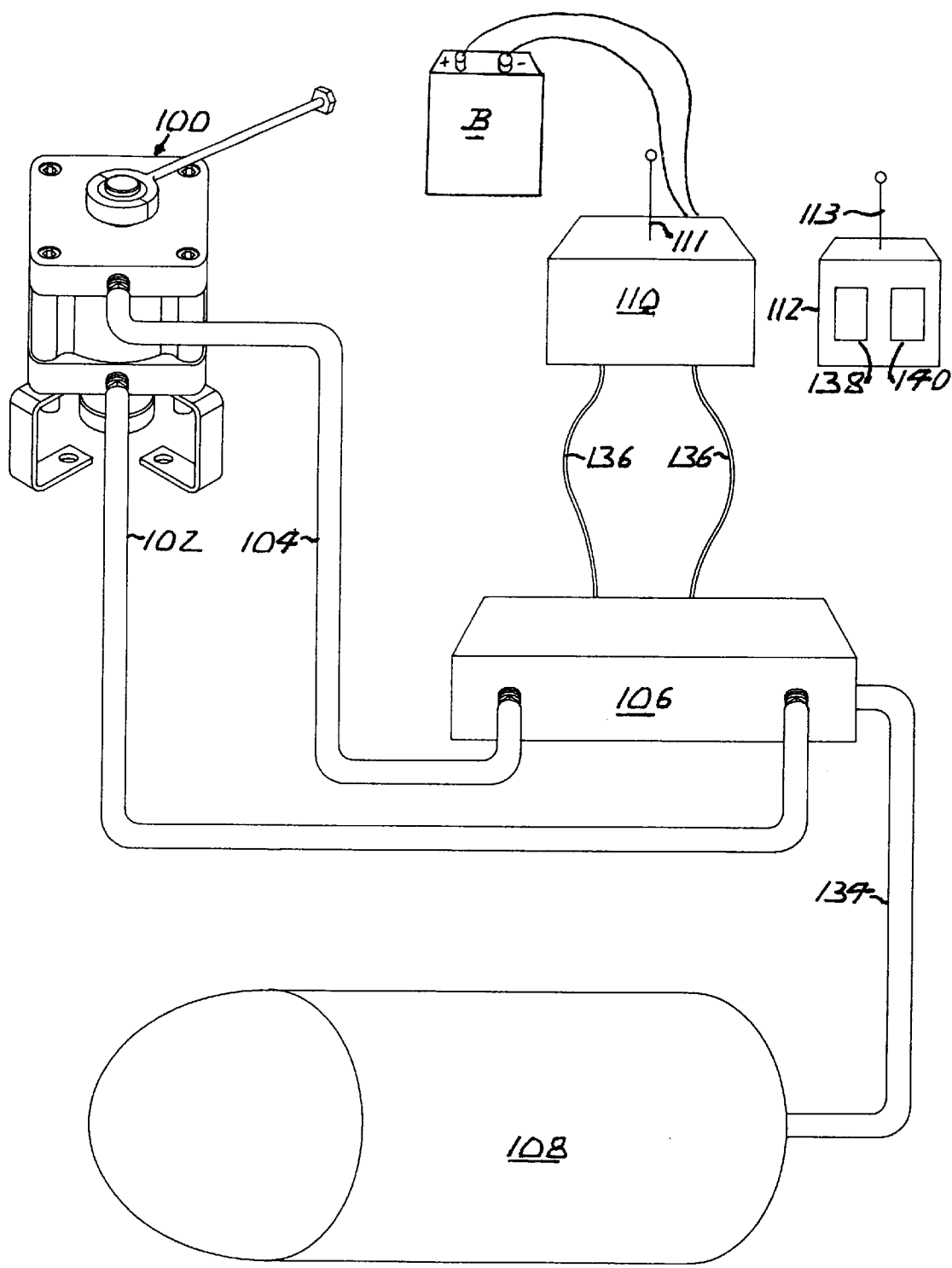
FIG. 2 is a schematic representation of the embodiment of FIG. 1.
Figure 3:
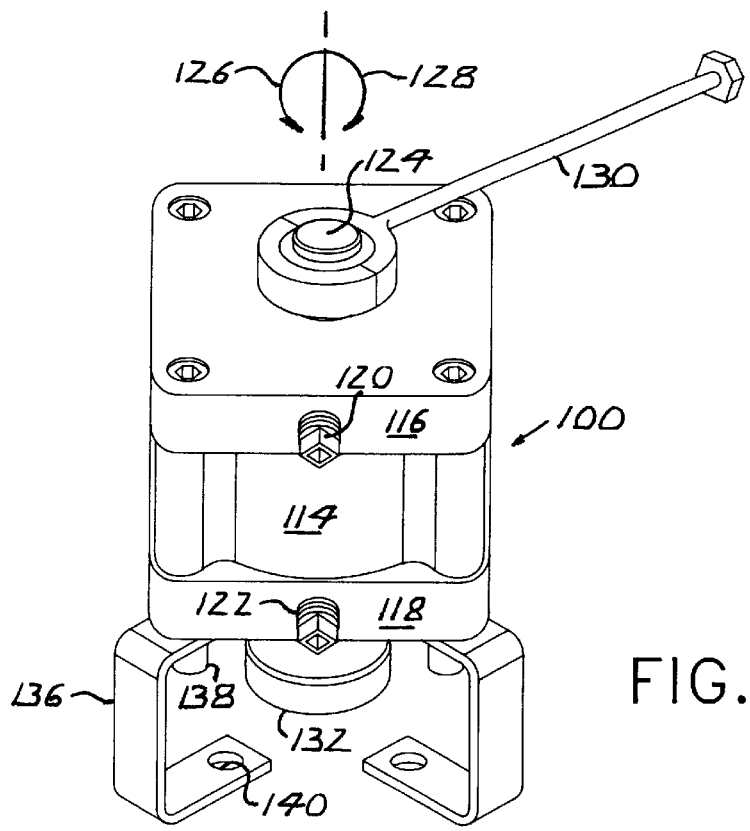
FIG. 3 is a top, right side elevational view of an embodiment of an actuator assembly constructed according to principles of the invention.
Figure 4:
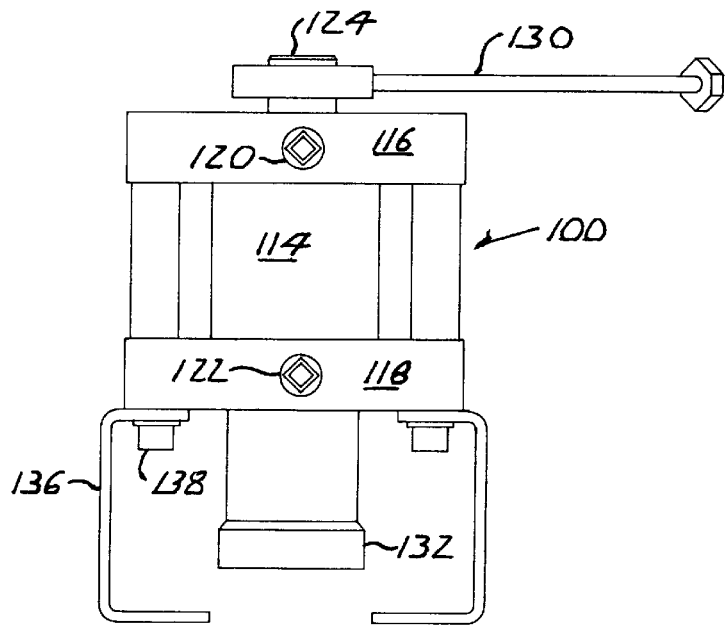
FIG. 4 is a right side elevational view of the embodiment of FIG. 3.

Referring to FIG. 1, an embodiment of the invention is shown incorporated in a conventional septic tank service vehicle V. The service vehicle V includes a large tank T for receiving and storing evacuated waste from septic tanks. A long evacuation hose H extends from the vehicle V and terminates in a nozzle (not shown) which is introduced into the opening O of a septic tank. A pump P induces a vacuum in the evacuation hose H to withdraw from the septic tank (not shown) and store in the tank T the contents of the septic tank. The pump P also may create pressure in the evacuation hose H to void matter from the evacuation hose H. Manipulating a flow control (not shown) extending from the pump P controls the pressure induced in the hose H.

Referring also to FIGS. 2–5, an embodiment of the invention includes an actuator 100 that mounts on and controls flow induced by the pump P. The actuator 100 includes a housing 114 and end caps 116 and 118. The housing 114 defines internal passageways (not shown). Compressed fluid delivered to the end cap 116 through opening 120 is delivered to one passage (not shown), while fluid delivered to the second end cap 118 through opening 122 is delivered to a second passage (not shown). Preferably, the compressed fluid is compressed air.

The actuator 100 also includes a spindle 124 including surfaces or passages that are responsive to compressed fluid delivered to the internal passages (not shown) of the housing 114. Compressed fluid introduced into one of the internal passages induces the spindle 124 to rotate in a first direction 126, while compressed fluid introduced into the second of the internal passages induces the spindle 124 to rotate in the opposite direction 128.

Figure 5:
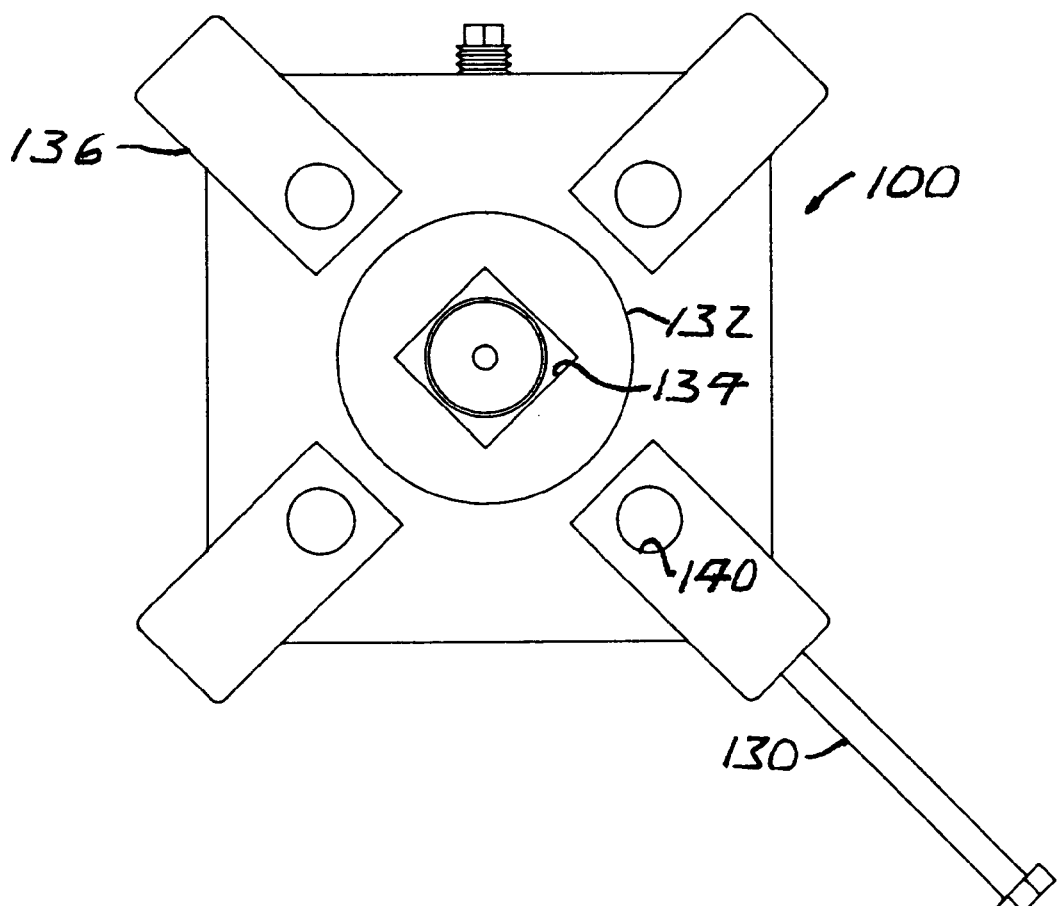
FIG. 5 is a bottom view of the embodiment of FIG. 3.

Referring to FIG. 5, the actuator 100 includes an adapter 132 for manipulating the flow control of a conventional pump. Typically, the flow control is in the form of a protruding valve stem having, for example, a square cross section. Accordingly, the adapter 132 is shown including a square-shaped bore which closely receives the valve. The shape of the bore 134 may be sized to accommodate any valve stem for any conventional pump. The adapter 132 is connected to the spindle 124, thus rotates in a manner corresponding to that described above. As the spindle 124 rotates, so does the adapter 132, hence the pump flow control, or valve stem. The actuator 100 also includes an emergency handle 130 to manually rotate the spindle 124, thus the pump flow control valve (not shown).

The actuator 100 receives fluid, such as compressed air, through conduits 102 and 104 from a solenoid 106. The solenoid 106 receives fluid from a fluid compressor 108. The solenoid 106 may be adjusted to maximize fluid pressure delivered by the compressor 108 through conduit 102, with minimal or no fluid pressure delivered through conduit 104; maximize fluid pressure delivered by the compressor 108 through conduit 104, with minimal or no fluid pressure delivered through conduit 102; or any ratio of fluid pressure in conduit 102 as compared with that in conduit 104. A pressure differential between the pressure f the fluid in conduit 102 and that in conduit 104 causes the spindle 124 to rotate until the pressure differential is minimized.

A control box 110 adjusts the solenoid 106 by energizing the solenoid, in manner well known in the art, such that an internal solenoid valve (not shown) covers or uncovers appropriate ports (not shown) for directing fluid from one to another.

The control box 110 energizes the solenoid 106, with energy supplied from a conventional battery B, in response to signals received from a remote signal sender 112. The battery B also may energize and enable the control box 110 to process these signals. The control box receives signals via an antenna 111 connected to the control box 110.

The remote signal sender 112 includes a plurality of switches 138 and 140 which activate associated circuits within the remote signal sender 112. The associated circuits, when energized, transmit distinct signals, such as a first signal and a second signal, which are received by the control box 110. The remote signal sender 112 transmits the signals to the control box 110 via an antenna 113 connected to the remote signal sender 112.

When the control box 110 receives the first signal, the control box 110 directs energy through the energy conduits 136 such that the solenoid 106 directs a greater amount of compressed fluid into conduit 102 than in conduit 104. When the control box 110 receives a second signal, the control box 110 directs energy through the energy conduits 136 such that the solenoid 106 directs a greater amount of compressed fluid into conduit 104 than in conduit 102. The spindle 124 of the actuator 100 responds to the pressure differential, as described above.

The actuator 100 includes a plurality of brackets 136 for connecting the actuator 100 with a conventional pump. The brackets 136 are secured to the end cap 118 with threaded fasteners 138 or any suitable fastening convention. The brackets 136 may be attached to the pump with threaded fasteners received through the apertures 140. The brackets 136 and apertures 140 are configured to match the hole pattern on the pump on which the actuator 100 is mounted.

Figure 6:
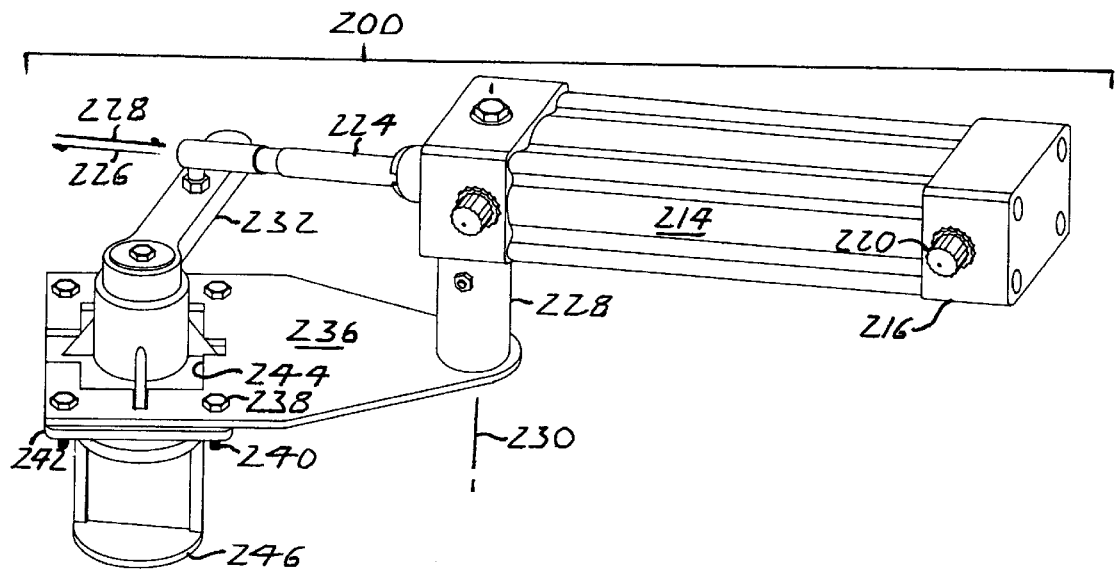
FIG. 6 is a top, right side elevational view of another embodiment of an actuator assembly constructed according to principles of the invention, mounted on a valve member of a pump, shown in dashed lines and not defining any part of the invention.

Referring to FIG. 6, a second embodiment of an actuator 200 is shown. Similar to the foregoing embodiment, the actuator 200 includes a housing 214 with internal passages, as is well-known in the art. The actuator 200 also has end caps 216 and 218 with openings 220 and 222, respectively, for receiving compressed fluid. In this embodiment, rather than a spindle, as in the foregoing embodiment, the actuator 200 is configured to translate a rod 224. Compressed fluid received in the opening 220 urges the rod 224 to translate in a first direction 226, while compressed fluid received in the opening 222 urges the rod 224 to translate in the opposite direction 228.

The actuator 200 is slidingly or rotationally mounted on the bracket 236 with a bushing or bearing assembly 228. The bushing or bearing assembly 228 allows the actuator 200 to pivot about the axis 230. This pivoting is necessary to accommodate the pivoting motion of the actuator when the rod 224 rotates a handle 232 which is fastened to and urges rotation of the pump valve stem 246.

The bracket 236 has a plurality of bores 238 for receiving threaded fasteners 240 that threadingly engage a valve stem 242 of a conventional pump. The slot 244 is configured to accommodate the protruding structure of the valve stem 242.

Figure 7:
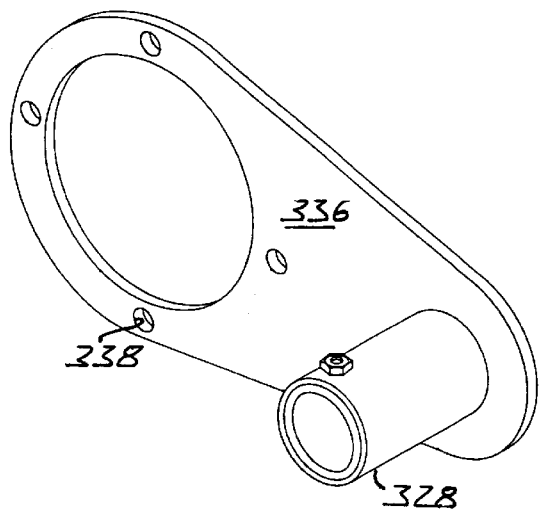
FIG. 7 is a top, right, rear view of an embodiment of an adaptor constructed according to principles of the invention.

Referring to FIG. 7, another embodiment of the bracket 336 is shown. The bracket 336 also has bores 338 and a bushing or bearing assembly 328. This bracket 336 accommodates other conventional pumps currently on the market.

The invention is not limited to the foregoing, but encompasses all improvements and substitutions consistent with the principles of the invention.

I claim:

1. A pump control apparatus comprising an actuator adapted to mount on a pump for controlling pressure generated by the pump; and
   an independent signal sender, responsive to an operator, adapted to transmit a first input and a second input;
   wherein said actuator, responsive to the first input, is adapted to induce the pump to increase pressure and, responsive to the second input, is adapted to induce the pump to decrease pressure.

2. The apparatus of claim 1, wherein the pump has a flow controller, further comprising:
   a solenoid for manipulating the flow controller; and
   a control box adapted to receive the first input and the second input and transmit a corresponding input to said solenoid.

3. The apparatus of claim 1, said actuator including a rotatable spindle, drivingly connected to a flow controller of the pump.

4. The apparatus of claim 1, said actuator including a translatable rod, drivingly connected to a flow controller of the pump.

5. The apparatus of claim 1, said actuator including an adaptor configured to engage with a flow controller of the pump.

6. A method for controlling a pump comprising:
   mounting an actuator on the pump; and
   transmitting an input to the actuator with an independent, user-operated signal sender, thereby inducing the pump to vary fluid pressure pumped thereby.

7. The method of claim 6, including introducing compressed fluid in the actuator.

8. The method of claim 6, including energizing a solenoid, thereby initiating fluid communication with a compressed fluid source.

9. The method of claim 6, wherein the actuator is responsive to a transmitted electromagnetic signal.

* * * * *

UNITED STATES PATENT AND TRADEMARK OFFICE
CERTIFICATE OF CORRECTION

PATENT NO. : 6,224,353 B1 Page 1 of 1
DATED : May 1, 2001
INVENTOR(S) : Zan Iseman It is certified that error appears in the above-identified patent and that said Letters Patent is hereby corrected as shown below:

Title page,
Item [56], References Cited, U.S. PATENT DOCUMENTS, insert:
-- 4,340,077   7/1982    Schiffer et al.
   4,990,076   2/1991    Lynch et al.
   5,182,834   2/1993    Wright et al.
   5,263,824   11/1993   Waldbeser et al.
   5,456,581   10/1995   Jokela et al.
   5,634,778   6/1997    Liegel et al.
   5,769,120   6/1998    Laverty Jr. et al.
   5,813,655   9/1998    Pinchott et al. --

Signed and Sealed this

Seventeenth Day of June, 2003

JAMES E. ROGAN
*Director of the United States Patent and Trademark Office*